April 28, 1936.  C. E. STROUD  2,038,771
ASSEMBLY FRAME FOR USE IN MAKING INSULATING GLASS
Filed Aug. 20, 1935  2 Sheets-Sheet 2
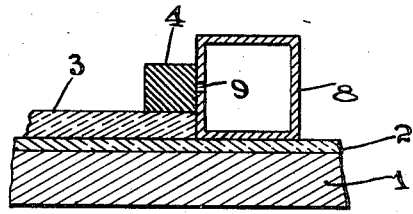
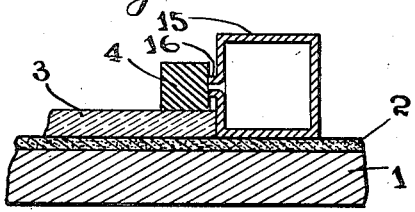
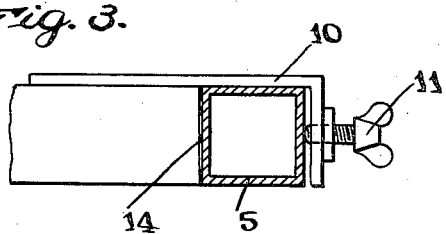
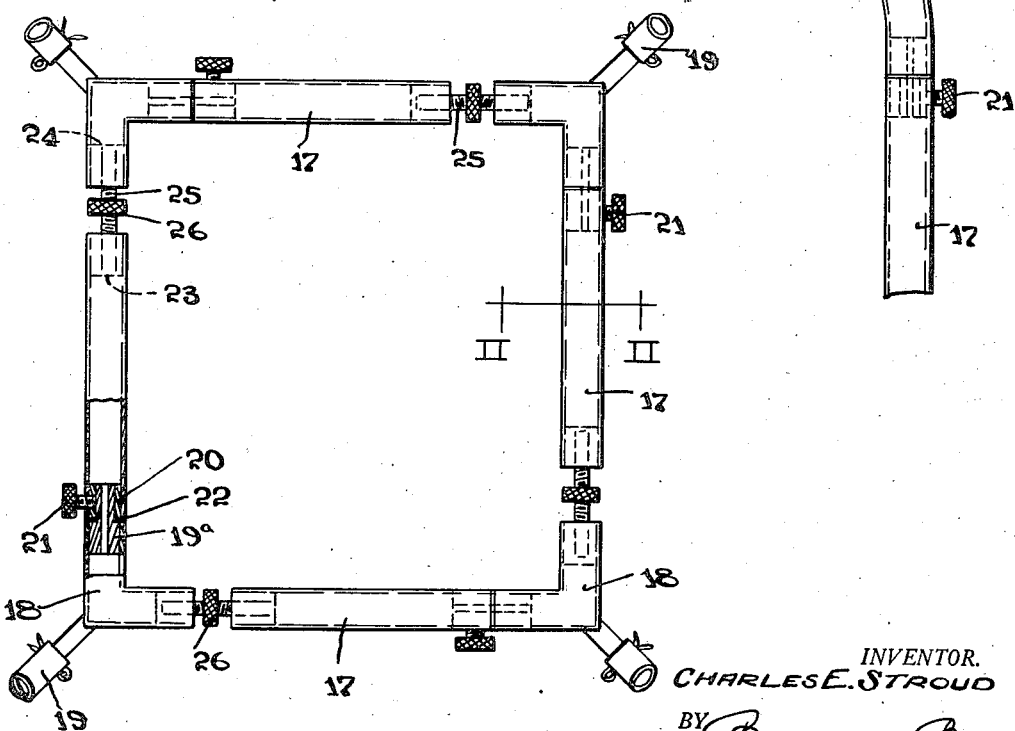
INVENTOR.
CHARLES E. STROUD
BY Bradley & Bee
ATTORNEYS.

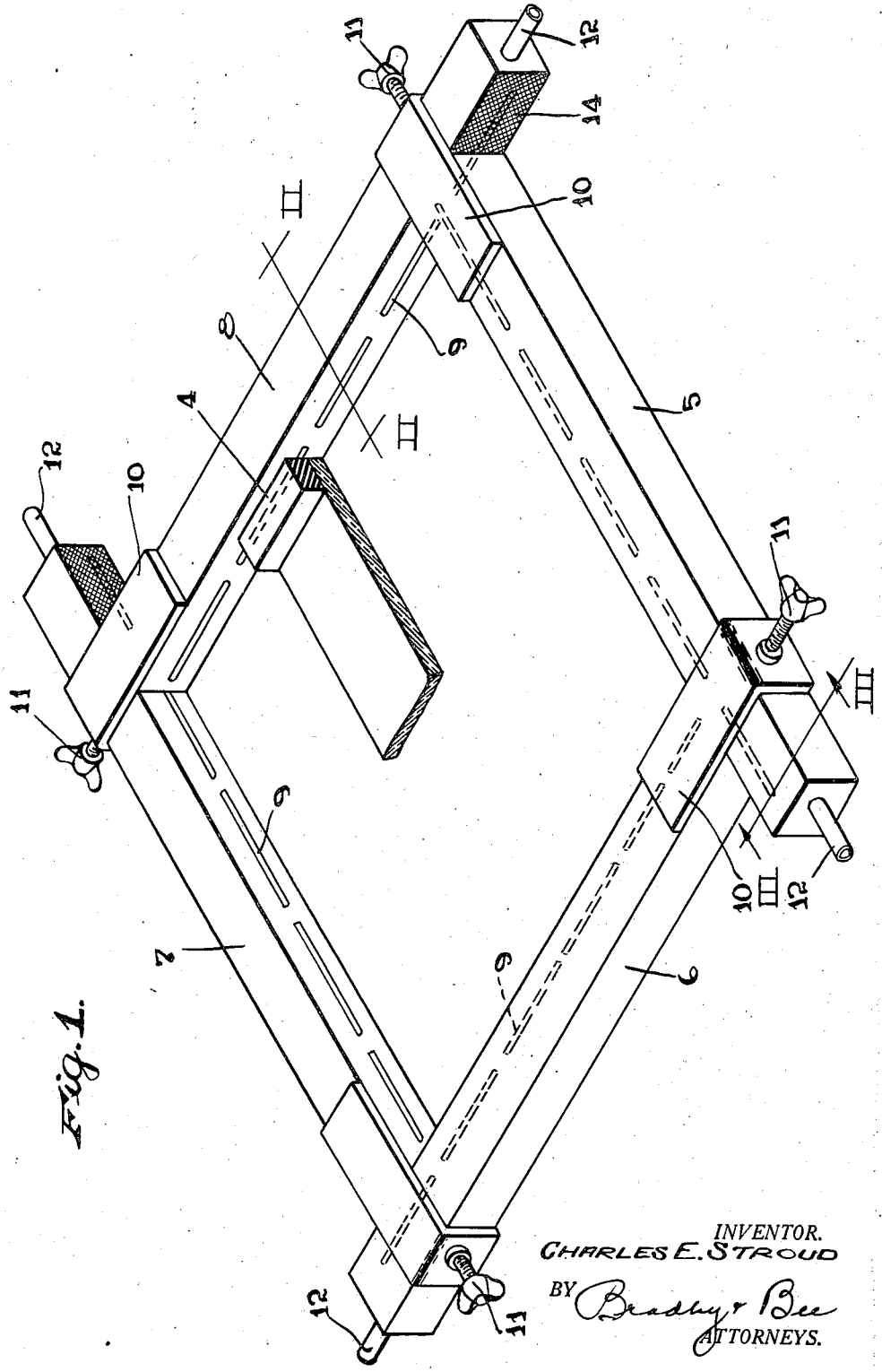

Patented Apr. 28, 1936

2,038,771

UNITED STATES PATENT OFFICE 2,038,771

ASSEMBLY FRAME FOR USE IN MAKING INSULATING GLASS

Charles E. Stroud, Ford City, Pa., assignor to Pittsburgh Plate Glass Company, Armstrong County, Pa., a corporation of Pennsylvania Application August 20, 1935, Serial No. 37,037

3 Claims. (Cl. 20—56.5)

The invention relates to apparatus for use in making insulating glass units, which consists of two glass sheets held in spaced relation by a spacer in the form of a strip of rubber or other similar material which lies between the glass sheets at their edges and forms a seal, such strip being cemented to the glass sheets or held under compression by a U-shaped frame which surrounds the sheets as shown in the application of Parkinson and Hamill No. 755,924, filed December 4, 1934. The labor involved in assembling the glass sheets with the spacer strips accurately positioned therebetween is very considerable, and the object of the present invention is to provide an assembly frame which will facilitate this step in the procedure and insure a more accurate positioning of the spacer strips than can be secured by the methods heretofore employed.

Briefly stated, the device comprises a hollow frame (adjustable as to size to suit different sizes of glass), such frame being slotted midway between the upper and lower faces, and means for exhausting the air from the frame. After a templet, of the same size and thickness as one of the glass sheets to be assembled, is fitted into the frame and the spacer is placed thereon, vacuum is applied to hold the spacer in position. The frame carrying the spacer may now be removed from the templet, and the two glass sheets which are to form the unit are positioned in the frame, one above the spacer and the other below. This completes the assembly, which is removed from the vacuum frame, and a frame of U shape (as in said application) is applied to the unit in those cases in which the unit requires a frame. In other cases no frame may be necessary depending on the size of the unit and the character of the spacer. Certain embodiments of the invention are illustrated in the accompanying drawings, wherein:

Figure 1 is a perspective view of the vacuum frame. Figs. 2 and 3 are sections on the lines II—II and III—III of Fig. 1, Fig. 2 also being a section on the line II—II of Fig. 5. Fig. 4 is a section similar to that of Fig. 2 illustrating a modification. Fig. 5 is a plan view partially in section of a modified frame construction. And Fig. 6 is a detail plan view showing a modified corner construction.

In using the frame it is placed upon a table 1 (Fig. 2), which is covered with a felt sheet 2, and the frame is adjusted so that it fits snugly around a templet 3, such templet preferably being a glass sheet, which is of the same thickness and overall dimensions as the glass sheets which are to be assembled in the two-pane structure. The spacer 4 of rubber or other suitable material is then positioned around the periphery of the templet in contact with the inner surfaces of the side members of the vacuum frame.

As shown in Figs. 1, 2, and 3, the vacuum frame is made up of four side members 5, 6, 7, and 8, which are secured together at their corners so that the frame may be adjusted to any desired size, depending upon the size of the insulating unit which is to be produced. The side members are made up of hollow tubes, rectangular in cross section, and are each provided on their inner walls with a set of narrow slots 9, so that when the parts are arranged in assembled relation, as indicated in Fig. 2, such slots come opposite the spacer 4. Each of the side members is provided at its end with a clamping plate 10 carrying a thumb screw 11, so that when the parts are fitted together, as indicated in Fig. 1, and the thumb screws are tightened, a relatively rigid frame is provided. Each of the side members is also provided with a connection 12, to which a flexible pipe 13 is attached leading to a suitable exhausting device.

After the parts are assembled, as indicated in Fig. 2, the air is exhausted from the side members, thus securing the spacer 4 in position. The vacuum frame carrying the spacer is now lifted from the templet 3 and set over a clean sheet of glass, which is to constitute one of the panes of the unit. A second pane of the same size is then laid on top of the spacer, with its upper surface flush with the upper faces of the tubes, thus completing the assembling operation. In some cases, the parts of the unit may be held in assembled relation by cement between the faces of the sheets and the spacer, and in other cases, the parts may be held against slipping by the application of a weight to the upper sheet of the unit, after which air is permitted to flow into the side members of the frame and it is removed from the unit. In order to prevent leakage into the tubes which constitute the side frame members when the end slots 9 are exposed due to the adjustment of the device, such slots may be covered by adhesive tape 14, as indicated in Figs. 1 and 3.

Fig. 4 illustrates the type of rectangular exhaust tube, which is employed when it is desired that the spacer 4 shall lie inward from the edges of the glass sheets a slight distance. This result is accomplished by punching out the side walls of the tubes 15, as indicated at 16, so that the ends of the slots lie inward with respect to the edges of the templet 2. In other respects this construction is the same as that of Figs. 1, 2, and 3.

Fig. 5 illustrates a modification, in which each of the side members is made up of a tube 17 and a corner member 18, the corner member being provided with an exhaust connection 19. The corner member is provided with a plug 19a welded thereto, and the reduced end of this plug fits slidably into a block 20 welded in the end of the tube 17. The two parts are clamped in assembled relation by means of the screw 21, and a gasket 22 is employed in order to secure a tight joint. The other end of each tube 17 is closed by a plug 23 in opposition to the plug 24 carried by the adjacent corner member. The two plugs are connected by means of a right and left hand stud 25 having a knurled adjusting disc. This makes the frame adjustable in size to take care of glass sheets of different sizes. The inner faces of the side members are provided with narrow slots 9, similar to those shown in Figs. 1 and 2 and similarly located. The frame is used in assembling operations, as heretofore described in connection with the frames of Figs. 1 and 2.

Fig. 6 illustrates a modification designed for use in assembling units having rounded corners, the corner member 27 being curved to correspond to the curvature at the corners of the glass sheets. In other respects this construction follows that of Fig. 5.

What I claim is:

1. A frame for use in assembling a pair of glass sheets with a spacer between their edges of such size that the glass sheets will fit snugly therein, and consisting of hollow side members of rectangular cross section, such side members being proivded with narrow slots through their inner side walls extending longitudinally thereof, and means for exhausting the air from the interior of the members.

2. A frame for use in assembling a pair of glass sheets with a spacer between their edges comprising a frame adjustable as to size to fit snugly around the sides of sheets of varying dimensions and consisting of hollow side members of rectangular cross section, such side members being provided with narrow slots through their inner side walls extending longitudinally thereof, and means for exhausting the air from the interior of the members.

3. Apparatus for use in assembling a pair of glass sheets with a spacer between their edges, a frame a templet of the same size and thickness as one of the glass sheets fitting snugly in said frame, said frame consisting of hollow side members of rectangular cross section having narrow slots through their inner side walls extending longitudinally thereof just above the level of the templet, and means for exhausting the air from the interior of the members.

CHARLES E. STROUD.